(12) United States Patent
Kobayashi et al.

(10) Patent No.: US 6,691,044 B2
(45) Date of Patent: Feb. 10, 2004

(54) PRODUCT ENVIRONMENTAL LOAD EVALUATION METHOD

(75) Inventors: Yoshinori Kobayashi, Yokohama (JP); Kumiko Amemiya, Kawasaki (JP); Kazuhito Haruki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/101,939

(22) Filed: Mar. 21, 2002

(65) Prior Publication Data
US 2002/0143473 A1 Oct. 3, 2002

(30) Foreign Application Priority Data

Mar. 28, 2001 (JP) ........................................ 2001-094197

(51) Int. Cl.⁷ ............................................. G06F 19/00
(52) U.S. Cl. ........................... 702/23; 700/97; 700/106; 707/103
(58) Field of Search ........................... 702/1, 2, 23, 28, 702/29, 81; 700/97, 106; 705/27; 707/103 R, 102, 104.1

(56) References Cited

U.S. PATENT DOCUMENTS 5,852,560 A 12/1998 Takeyama et al. ............ 700/97
5,878,433 A * 3/1999 Miyamoto .................. 707/103

OTHER PUBLICATIONS

Kakihana et al., "Method of support of environmentally concerned design of manufactured goods", Pub. No: US 2002/0099587, Filed Date: Nov. 29, 2001, Priority Filed Date: Jan. 19, 2001.*

Hiroki Hondo, et al., "Actual Estimation of Environmental Burdens with an Input–Output Table—Fuel Consumption of I–O Sectors and Imported Goods", Energy and Resources, Vol. 20, No. 1, 1999, pp. 93–99.

H. Hondo, et al., "Environmental Burdens Associated with Production Activities in Japan Using and Input–Output Table", Socio–Economic Research Center, Criepi Report No. Y97017, 1997, pp. i and 22–24.

* cited by examiner

Primary Examiner—John Barlow
Assistant Examiner—John Le
(74) Attorney, Agent, or Firm—Oblon, Spivak, McClelland, Maier & Neustadt, P.C.

(57) ABSTRACT

A product environmental load evaluation method comprises computing fuel input coefficients, inverse matrix coefficients and input coefficient matrix of imported goods referring to an Input-Output table regarding domestic goods, generating emission coefficients referring to an existing data stochastic document, estimating a direct emission matrix based on fuel input coefficients and emission coefficients, computing environmental load of the domestic goods based on the inverse matrix coefficients and direct emission matrix, computing overseas environmental load emission coefficients of the imported goods based on overseas parameter every addition of an imported good, computing imported good environmental load based on the input coefficient matrix of the imported goods and the overseas environmental load emission coefficients, and computing product environmental load by adding the domestic good environmental load to be provided fixedly and the imported good environmental load updated every addition of an imported good.

17 Claims, 4 Drawing Sheets $$(\varepsilon d_1 \cdots \varepsilon d_j \cdots \cdots \varepsilon d_n) = (E_1 \cdots E_j \cdots \cdots E_n) \times \begin{bmatrix} 1 & 0 & \cdots & & & 0 \\ 0 & 1 & & & & \vdots \\ \vdots & & \ddots & & & \vdots \\ & & & 1 & 0 & \\ 0 & \cdots & \cdots & 0 & 1 \end{bmatrix} \begin{Bmatrix} ad_{11} & & ad_{1j} & \cdots & ad_{1n} \\ ad_{i1} & \cdots & ad_{ij} & & \vdots \\ \vdots & & \vdots & & \vdots \\ ad_{m1} & & & & ad_{mn} \end{Bmatrix}^{-1}$$

$$+ (0 \cdots \varepsilon_{mj} \cdots 0) \times \begin{pmatrix} 0 & & am_{i1} & & 0 \\ \vdots & & \vdots & & \vdots \\ 0 & & am_{ij} & & 0 \\ \vdots & & \vdots & & \vdots \\ 0 & & am_{in} & & 0 \end{pmatrix} \times \begin{bmatrix} 1 & 0 & \cdots & & & 0 \\ 0 & 1 & & & & \vdots \\ \vdots & & \ddots & & & \vdots \\ & & & 1 & 0 & \\ 0 & \cdots & \cdots & 0 & 1 \end{bmatrix} \begin{Bmatrix} ad_{11} & & ad_{1j} & \cdots & ad_{1n} \\ ad_{i1} & \cdots & ad_{ij} & & \vdots \\ \vdots & & \vdots & & \vdots \\ ad_{m1} & & & & ad_{mn} \end{Bmatrix}^{-1}$$

F I G. 4

PRODUCT ENVIRONMENTAL LOAD EVALUATION METHOD

CROSS-REFERENCE TO RELATED APPLICATIONS

This application is based upon and claims the benefit of priority from the prior Japanese Patent Application No. 2001-094197, filed Mar. 28, 2001, the entire contents of which are incorporated herein by reference.

BACKGROUND OF THE INVENTION

1. Field of the Invention

The present invention relates to product environmental load evaluation method of evaluating environmental load of products and a system therefor.

2. Description of the Related Art

In recent years, environmental issues have socially become significant. Because of this, it is required to consider reducing the load that the products exert on environment as well as considering the influence that production activity in factory exerts on environment. Thus, life cycle assessment (LCA: Life Cycle Assessment) attracts attention. LCA is a technique for analyzing and evaluating the load that the products exert on environment through life. In other words, LCA grasps environmental load through life cycle of products (raw materials acquisition, manufacturing, distribution, usage, disposalrecycling), and is used for reduction of environmental load. LCA represents overall evaluation of products in product life. Further, LCA can be utilized for improving the load scientifically or rationally by grasping load such as air pollution, the resource efficiency, a quantity of waste, etc., quantitatively. However, LCA needs many time and labor in evaluation when performing minute processing study for the whole life cycle of a product.

The products such as home electric appliances are large in number and in kind, and occupy large environmental load. Therefore, LCA evaluation is important. In particular, LCA is required for checking what kind of environmental load is generated in the life cycle of a product, in which stage of the cycle it is generated, and how heavy it is. It is also required for checking what should be improved and in which stage the improvement should be done, so as to lighten the environmental load. There is proposed a technique useful for subjecting products of a short development cycle such as home electric appliances products to life cycle evaluation at the design stage.

The environmental load over the life cycle of products can be grasped by the above prior art. However, since the environmental load calculated by the database of an environmental load emission intensity unit is different greatly from an actual value, it is a problem what kind of database should be employed. Reliable data for building up the environmental load emission intensity unit database are data of an "Input-Output table" for example. The Input-Output table includes everything of demand and feeding of every field of domestic industry entirely. Therefore, if this Input-Output table is used, the emission intensity unit dated back to the source can be calculated. Further, the reliable data are not limited to the Input-Output table.

If the emission intensity unit is standardized as an industry standard, it may be used. Further, the process analysis method and input-output analysis method are known as data calculation methods. The process analysis can calculate comparatively exact value, but it is not effective due to needs of vast labor. The input-output analysis has an advantage capable of calculating wide data since it includes everything of all the domestic industry. However, since it indicates a mean value of the domestic industrial products, it includes data different from an actual value.

Further the hybrid system combining the process analysis with the input-output analysis method in order to offset the weak points of both is proposed. It is original LCA to calculate the entire environmental load dated back to the source such as the material and resource. However, it is very difficult to date back to the material and resource due to non-maintenance of data and so on, actually. The Input-Output table is used due to advantages to save the trouble for collecting all data. However, the rippling effect of the Input-Output table is limited in this country, and do not consider environmental load to occur with manufacturing in overseas like imported materials.

The imported materials such as aluminum are accompanied with such large overseas loads that are impossible to ignore. Therefore, it has been pointed out that the environmental load does not fit the fact only by domestic rippling effect. A technique to combine environmental load to occur in manufacturing and the transportation in overseas with environmental load of the country is proposed as a method to solve such weak points. This is a hybrid system with a process analysis and an input-output analysis method reported by Central Research Institute of Electric Power Industry. This method adds the environmental load in overseas to the domestic environmental load estimated by an input-output analysis method by a cumulative manner, to calculate the emission intensity unit including overseas emission.

In this report, five kinds of goods: coal, crude oil, LPG (LNG), iron ore and aluminum ingot are treated as imported goods. The environmental load in overseas is investigated as for these five goods. Environmental load on five imported goods is estimated by the process analysis. However, the environmental load of the other majority goods is calculated with they being considered as the domestic production.

By the method, the environmental load emission intensity unit including the environmental load to occur about all materials abroad is value to be near to reality and desirable. However, only these five goods are not enough. The nonferrous metals such as copper, lead, zinc occupy a lot of ratios in component part of home electric appliances, for example. For the reasons, errors of the environmental load calculated by ignoring overseas load of nonferrous metal increase.

Further, even if the improvement that seems to make it reduce environmental load by a method to change materials configuration of products is performed, if iron and non-iron do not use environmental load unit consumption obtained based on the similar calculation condition, accurate evaluation cannot be obtained. Accordingly, this cannot apply to product development for environmental load reduction. However, it is extremely difficult to perform data search with respect to all the imported goods in reality.

It is an object of the invention to provide a product environmental load evaluation method including setting criteria to determine the range to be investigated in order to estimate more realistic environmental load, and calculating the environmental load unit consumption that is considered environmental load to occur in overseas about materials selected according to this criteria.

BRIEF SUMMARY OF THE INVENTION

According to the first aspect of the invention, there is provided a product environmental load evaluation method comprising: computing fuel input coefficients, inverse matrix coefficients and input coefficient matrix of imported goods referring to an Input-Output table regarding domestic goods; generating emission coefficients referring to an existing data stochastic document; estimating a direct emission matrix based on fuel input coefficients and emission coefficients; computing environmental load of the domestic goods based on the inverse matrix coefficients and direct emission matrix; computing overseas environmental load emission coefficients of the imported goods based on overseas parameter every addition of an imported good; computing imported good environmental load based on the input coefficient matrix of the imported goods and the overseas environmental load emission coefficients; and computing product environmental load by adding the domestic good environmental load to be provided fixedly and the imported good environmental load updated every addition of an imported good.

According to the second aspect of the invention, there is provided a product environmental load evaluation program recorded on a computer readable medium, comprising: means for instructing a computer to compute fuel input coefficients, inverse matrix coefficients and input coefficient matrix of imported goods referring to an Input-Output table regarding domestic goods; means for instructing the computer to generate emission coefficients referring to an existing data stochastic document; means for instructing the computer to estimate a direct emission matrix based on fuel input coefficients and emission coefficients; means for instructing the computer to compute environmental load of the domestic goods based on the inverse matrix coefficients and direct emission matrix; means for instructing the computer to compute overseas environmental load emission coefficients of the imported goods based on overseas parameter every addition of an imported good; means for instructing the computer to compute imported good environmental load based on the input coefficient matrix of the imported goods and the overseas environmental load emission coefficients; and means for instructing the computer to compute product environmental load by adding the domestic good environmental load to be provided fixedly and the imported good environmental load updated every addition of an imported good.

BRIEF DESCRIPTION OF THE SEVERAL VIEWS OF THE DRAWING

FIG. 4 shows a matrix that developed equation 3; and

DETAILED DESCRIPTION OF THE INVENTION

Figure 1:
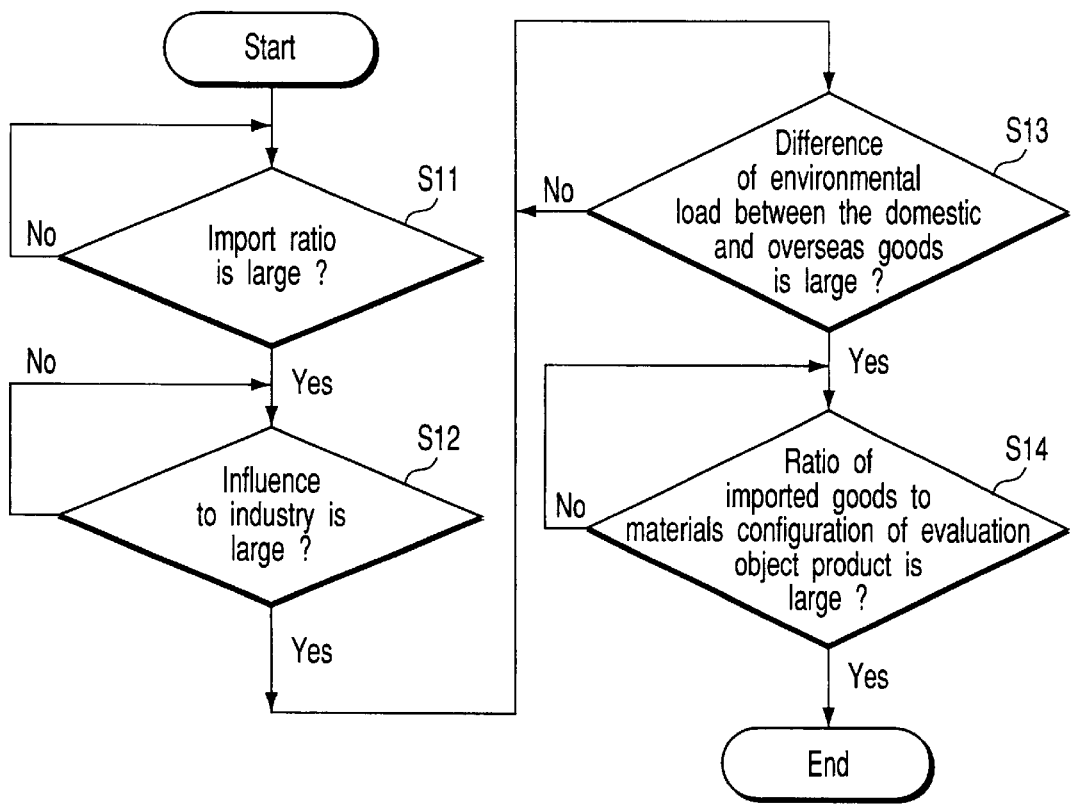
FIG. 1 shows a flowchart to explain an environmental load evaluation method of a product according to one embodiment of the present invention.

When environmental load evaluation of products is executed, it is necessary to set some criteria in order to determine whether it is necessary to investigate environmental load to be exhausted in overseas. The calculated environmental load does not fit reality if the imported goods satisfying the criteria do not consider environmental load in overseas. A realistic environmental load can be calculated by investigating the environmental load to occur in overseas.

The environmental load evaluation method of the embodiment of the present invention will be described referring to the drawings. In step S11, when evaluating the environmental load of a product, goods of a high import ratio to Japan (a ratio of import to occupy in home demand) are selected from among the goods included in the product. When overseas production ratio is large, the environmental load in overseas is not able to ignore. Thus, such imported goods have to be investigated by priority. Further, goods of import rate 100% must be always considered.

In step S12, the imported goods exerting large influence on domestic industry are chosen from the selected goods. The sensitivity exponent derived from the Input-Output table can be utilized here. The sensitivity exponent is an index which expresses the influence that each good exerts on the domestic industry. In other words, the sensitivity exponent indicates quantity supplied which is needed directly or indirectly in each section when a final demand of 1 unit is included in each good. The sensitivity exponent indicates a large numeral value about a good overused in a wide field. In particular, the imported goods exerting an influence on domestic industry in Japan are investigated by priority. The sensitivity exponent is calculated by equation 1:

Sensitivity exponent for each section=sum of inverse matrix coefficients of each row/mean value of the total sum of inverse matrix coefficients of rows     1

In step S13, goods indicating large difference between environmental loads of the domestic production and overseas production are selected. When a large difference exists between production technology in Japan and production technology in overseas, the environmental loads have large difference between there too. Therefore, the environmental loads based on differences in production technology between domestic and overseas productions have to be investigated by priority. The index to determine difference of industrial structure between production country of imported goods and Japan, includes energy efficiency, energy mixture (electric power supply configuration), elasticity of energy-labor substitution, and elasticity of capital-labor substitution. This index can be substituted by the import ratio in step S11.

The goods of large import ratio can be dealt with assumption that it is obvious that the industrial structure of the production country differs from Japanese industrial structure. Assuming that the imported goods of a high price increase large energy consumption in overseas, the goods having large price difference between domestic production and overseas production can express clearly a technical difference between the overseas production and domestic production.

In step S14, the imported goods occupying a large ratio in materials configuration of the products and systems that are evaluation objects are selected. If a ratio of imported goods used in the products and systems as objects for environmental load evaluation is large, the imported goods exerts a large influence on the calculated LCA result. Therefore, such imported goods have to be investigated by priority.

Figure 2:
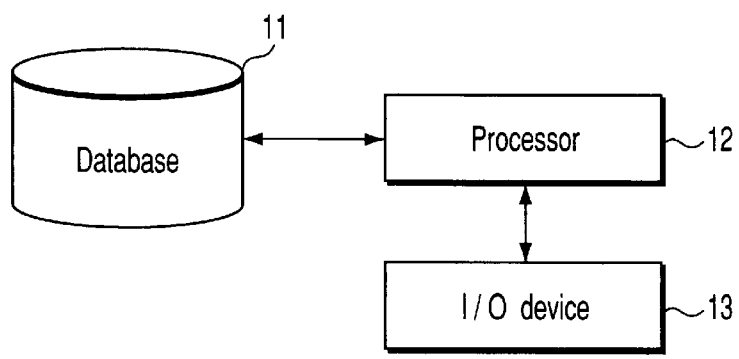
FIG. 2 shows a block diagram of an apparatus carrying out the environmental load evaluation method.

The processes described above are executed by hardware including a database 11, processor 12 and I/O device 13 as shown in FIG. 2, for example. Regarding the imported goods satisfying the selection criteria described above, the environmental load that occurs overseas is investigated. In order to grasp the environmental load that occurs overseas, the imported goods have to be subjected to a process analysis of dig in overseas, domestic transportation and marine transportation to Japan. The environmental load such as energy consumption, $CO_2$ emission, SOx emission, NOx emission is estimated by gaining an understanding of power consumption or materials input amount in each process (for example, dig, handling, domestic transportation, handling, overseas transport).

The exporting countries, namely producing countries of the imported goods are intended for higher several countries of an import share. If most of imported materials are limited to higher 5 countries of the import share, 80% of import volume to Japan is covered. The power spent in each process can reflect in precision the present conditions of energy feeding of each country by using power generation configuration ratio in the producing country of each imported good. Further, the weighted mean based on the import volume may be used. On the domestic transportation in overseas and marine transportation to Japan can be reflected transportation distance from the producing country. Further, the weighted mean may be used. Regarding the imported goods, which are selected according to the basis of selection, the environmental load that occurs overseas is added to the environmental load exhausted in the country. The environmental load to occur in the country may be estimated by the rippling effect based on the process analysis or input-output analysis method. If the domestic environmental load is a value obtained by the process analysis, it can be added to the environmental load generated in overseas as it is. In particular, when the environmental load in the country is obtained by an input-output analysis method, the hybrid system is adopted. Accordingly, the equation 2 is necessary.

This computation expression is proposed by Central Research Institute of Electric Power Industry (document: Report of Central Research Institute of Electric Power Industry "Energy consumption and $CO_2$ emission in producing goods and services with input-output analysis—Concerning application of Input-Output table to LCA—)". This method obtains the environmental load of only some imported goods by the process analysis, and calculates the environmental load with all the other goods considered being produced domestically.

To ∈m of this computation expression can be applied the environmental load emission intensity unit of the imported goods selected by the basis of selection.

$$\epsilon_d = E \times (I-(Ad+A'm))^{-1} + \epsilon m \times A''m \times (I-(Ad+A'm))^{-1} \quad 2$$

∈d Unit consumption matrix of domestic goods
∈m Environmental load emission intensity unit matrix in overseas of imported goods
E Direct emission coefficient matrix
Ad Input coefficient matrix of domestic goods
A'm Input coefficient matrix of imported goods regarded as domestically produced
A''m Input coefficient matrix of imported goods In this formula, all the goods other than the imported goods are regarded as being domestically produced, so that rippling effect is obtained. If the export country (producing country) has completely the same industry structure as Japan or the industry structure very similar thereto, the imported goods regarded as domestic production is small in error with respect to domestic goods. However, if the imported good, which are not essentially domestic production, are contained in domestic rippling effect, the possibility that unrealistic rippling effect produces is high, and error cannot be ignored. When the goods regarded as the imported goods are added, input coefficients to calculate inverse matrix coefficients vary. The variation of the input coefficients is identical to the variation of industrial structure itself. In other words, the rippling effect itself varies. The variation of this rippling effect exerts an influence on the environmental load emission intensity unit of all goods, and the environmental load emission intensity unit varies about all goods. In other words, a value having completely another boundary is calculated by adding the imported goods, so that comparison of this value with a conventional environmental load emission intensity unit does not make sense. More specifically, when the environmental load of imported goods in overseas is considered, it is difficult to see how much effect this has on the environmental load evaluation.

Based on equation 2, a case considering overseas load of six imported goods (crude oil, metallurgical coal, steam coal, LNG, aluminum, iron ore) is compared with a case considering overseas load of 9 goods including three goods, i.e., copper ore, zinc ore and lead ore and the above 6 goods. According to the comparison, the variation of the rippling effect due to the addition of the overseas load of the copper ore is as follows. That is, the environmental load unit consumption ($CO_2$ emission intensity unit) of the "copper" section as an input section of the copper ore is 5.22 [$gCO_2$/yen] in six goods and 2.72 [$gCO_2$/yen] in nine goods.

The calculation result becomes small by adding overseas load data newly. This is caused by boundaries completely different between the overseas loads. The data comparison does not make sense. Therefore, the effect obtained by adding data newly cannot be watched. Thus, the following formulation can be realized. Only specific imported goods are treated as domestic production. These imported goods are not included in the domestic rippling effect (the exchanges between industries), but only pure domestic goods are included in the rippling effect.

$$\epsilon_d = E \times (I-Ad)^{-1} + \epsilon m \times A''m \times (I-Ad)^{-1} \quad 3$$

∈d Unit consumption matrix of domestic goods
∈m Environ metal load emission intensity matrix of environmental load of imported goods in overseas
E Direct emission coefficient matrix
Ad Input coefficient matrix of domestic goods
A''m Input coefficient matrix of selected imported goods In formality of equation 3, domestic rippling effect is fixed (the boundary of rippling effect is fixed) regardless of what number of imported goods should be treated as objects. If search regarding overseas production is performed, only the searched goods can be reflected additionally. Even if the overseas goods are assumed as domestic production since the environmental load data of overseas production is not available, the overseas goods do not affect to computation of the domestic rippling effect at all, and can compare with previous data.

In equation 2, it is necessary to estimate inverse matrix coefficients ((I−(Ad+Am))−1) in equation 1) again with addition of imported goods. Since the inverse matrix coefficients are uniformity according to equation 3, only the data added newly can be added. The calculation flow based on equation 3 is shown in FIG. 3.

Figure 3:
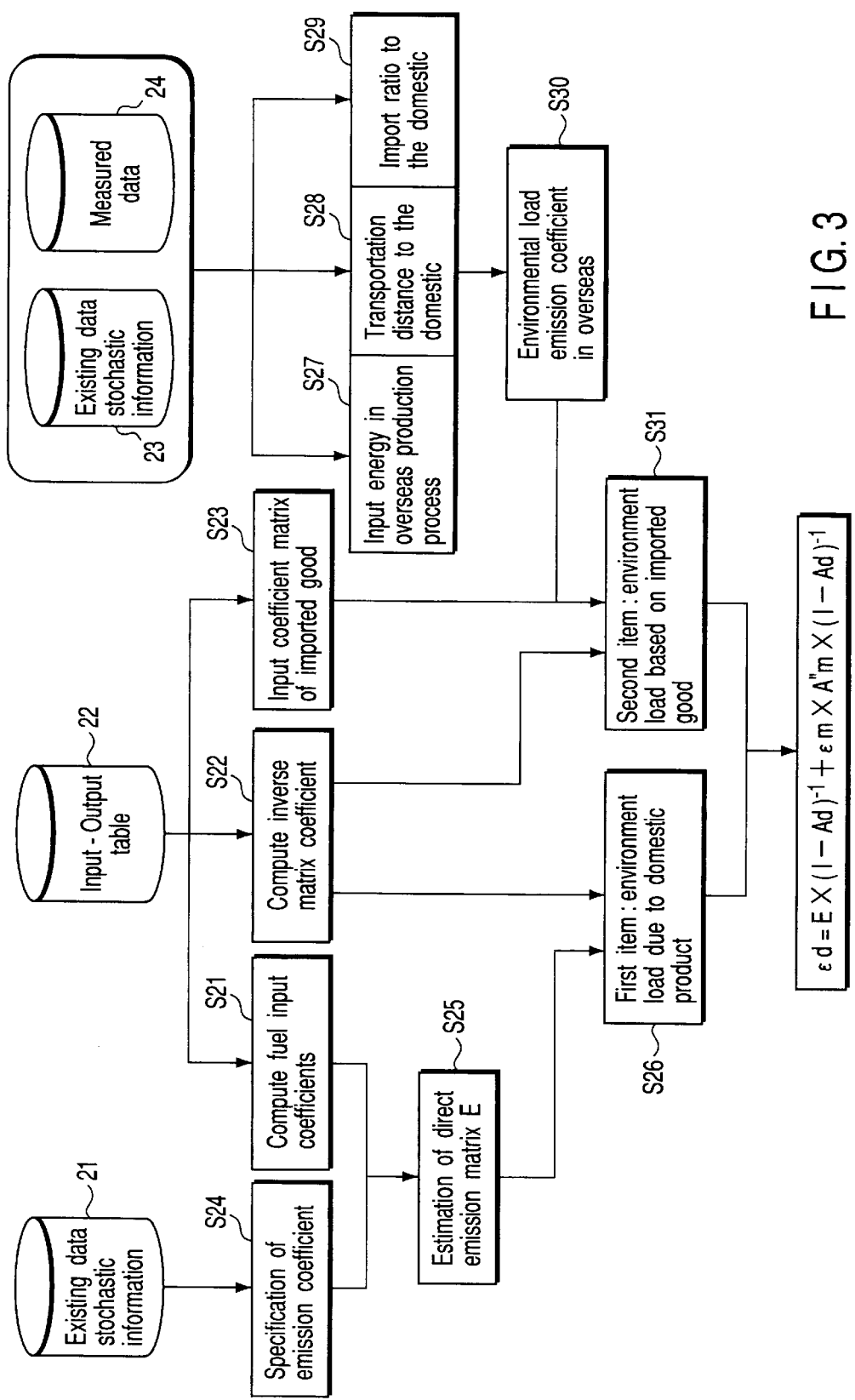
FIG. 3 shows a flowchart to explain the environmental load evaluation method more in detail.

According to the FIG. 3, an existing data stochastic information database 21 and Input-Output table database 22 are prepared. Fuel input coefficients and inverse matrix coefficients are calculated using the input-output table of the Input-Output table database 22 (steps S21, S22), and input coefficient matrix A''m of the imported goods is calculated (S23). Environmental load emission coefficients are obtained based on existing data such as stochastic information of existing data stochastic information database 21 or unification data of the industry (step S24). A direct emission matrix E is estimated by emission coefficients and fuel input coefficients (S25). The environmental load of the domestic good is calculated by this direct emission matrix E and inverse matrix coefficients (S26).

As for imported goods, input energy in overseas production process, transportation distance to the country, import ratio to the country are investigated, using the existing data stochastic information database 23 and data of the measurement database 24 (step S27, S28, S29). The environmental load emission coefficients εm in overseas are calculated by these results (S30).

In step S31, the environmental load of the imported goods is calculated by inverse matrix coefficients provided with step S22, input coefficient matrix of imported goods provided at step S23 and overseas environmental load emission coefficient εm provided with step S30.

The environmental load of the domestic and imported goods provided by steps S26 and S31, are substituted as the first term and the second term by equation 3 respectively, so that the unit consumption matrix εd of domestic goods is calculated. When the equation 3 is displayed by the elements of the matrix, it can be expressed with equation as shown in FIG. 3.

An evaluation example wherein the evaluation object is a home electric appliance will be described as follows. A computation example applied to a washing machine is explained concretely. A $CO_2$ emission is described as an example of the environmental load, but energy consumption and environmental load materials such as SOx, NOx can be computed, too.

SELECTION OF THE IMPORTED GOODS

At first, the goods of large import ratio are listed. Referring to the Input-Output table of 1995, for example, the import ratio is larger ocean transportation, metallic mineral, crude oil-natural gas, other edible agriculture crops, other nonferrous metal minerals, coal, wood chip, other nonferrous metal ingots, fish oil-fish bony parts, beans, other non-edible agriculture crops, wheat, aluminum (reproduction), accessories, bagspouchesother leather products, caoutchouc, ... in this order. If it is examined more in detail, the influence on domestic industry of imported goods is additionally considered.

The product of the input coefficient matrix of the imported goods and inverse matrix coefficient for obtaining the domestic rippling effect (Am (I–Ad)–1 in item the second of formula 2) are computed. The sum of the numerical values of each line is calculated, and the sensitivity exponent of the imported goods is calculated. The larger the numerical value of the goods is, the larger the influence on the domestic industry is. This sensitivity exponent shows whether the section inputting each imported good has a rippling effect on Japan industry. In other words, this sensitivity exponent is index considering import ratio and Japanese industrial structure. Therefore, the goods of large index or imported goods inputted to the section of a large index exerts a large influence on the last environmental load emission intensity unit.

When the imported goods are enumerated in descending order of the sensitivity exponent, there are sections such as oil goods, coal good, feed, petroleum basic chemicals, other nonferrous metal ingots, utility power, copper, pig iron, pulp, vegetable oil fat, finance, ocean transportation, tanning/fur, nuclear fuel, aluminum rolled goods, other metal articles, aluminum (including recycle), city gas, leadzinc (including recycle), and nonferrous metal bares. The imported goods inputted to these sections can include crude oil, coal (general charcoalraw materials charcoal), LNG, copper ore, iron ore, zinc ore, aluminum ingot, lead ore, zinc ore, etc.

From the above materials is selected only materials associated with the home electric appliance that is the evaluation object of LCA. Home electric appliances are made from iron and steel, nonferrous metal, resin, glass, fiber, electronic parts, etc., generally. Therefore, agriculture and forestry fisheries relational, service relational, and other products are excluded. Further, in the Input-Output table, some goods are gathered up as one section.

Other nonferrous metal metals include, for example, gold ingot, silvery ingot, titanium, tungsten, tin, antimony, gold reproduction ingot, silver reproduction ingot, silver alloy, copper reproduction ingot, copper alloy. However, goods included in the home electric appliances product are limited. Furthermore, the goods of low import volume are not almost contained in the product, so that they do not exert influence on product LCA results. Furthermore, the ocean transportation is investigated as regards each imported good, and clapped on as environmental load of each good. Accordingly, as a result, the ocean transportation is considered. As a result, the goods can be narrowed down to metallic minerals, crude oilnatural gas, other nonferrous metal minerals, coal, other nonferrous metal ingot, aluminum (including recycle), and pulp.

In the above-mentioned result, the goods that must consider environmental load to occur in overseas under Japanese industrial structure in 1995, are crude oil, natural gas, LNG, raw materials charcoal, public charcoal, iron ore, copper ore, lead ore, zinc ore, aluminum ingot, etc.

ESTIMATION OF OVERSEAS ENVIRONMENTAL LOAD

Regarding the selected imported goods, the $CO_2$ emission intensity units occurring overseas are respectively investigated. Input power and input materials are investigated by every process, such as extraction and transportation in overseas. The environmental load emission intensity unit of power is obtained based on electric power configuration ratio of the producing country.

ESTIMATION OF ENVIRONMENTAL LOAD EMISSION INTENSITY UNIT BASED ON INPUT-OUTPUT ANALYSIS

Figure 5:
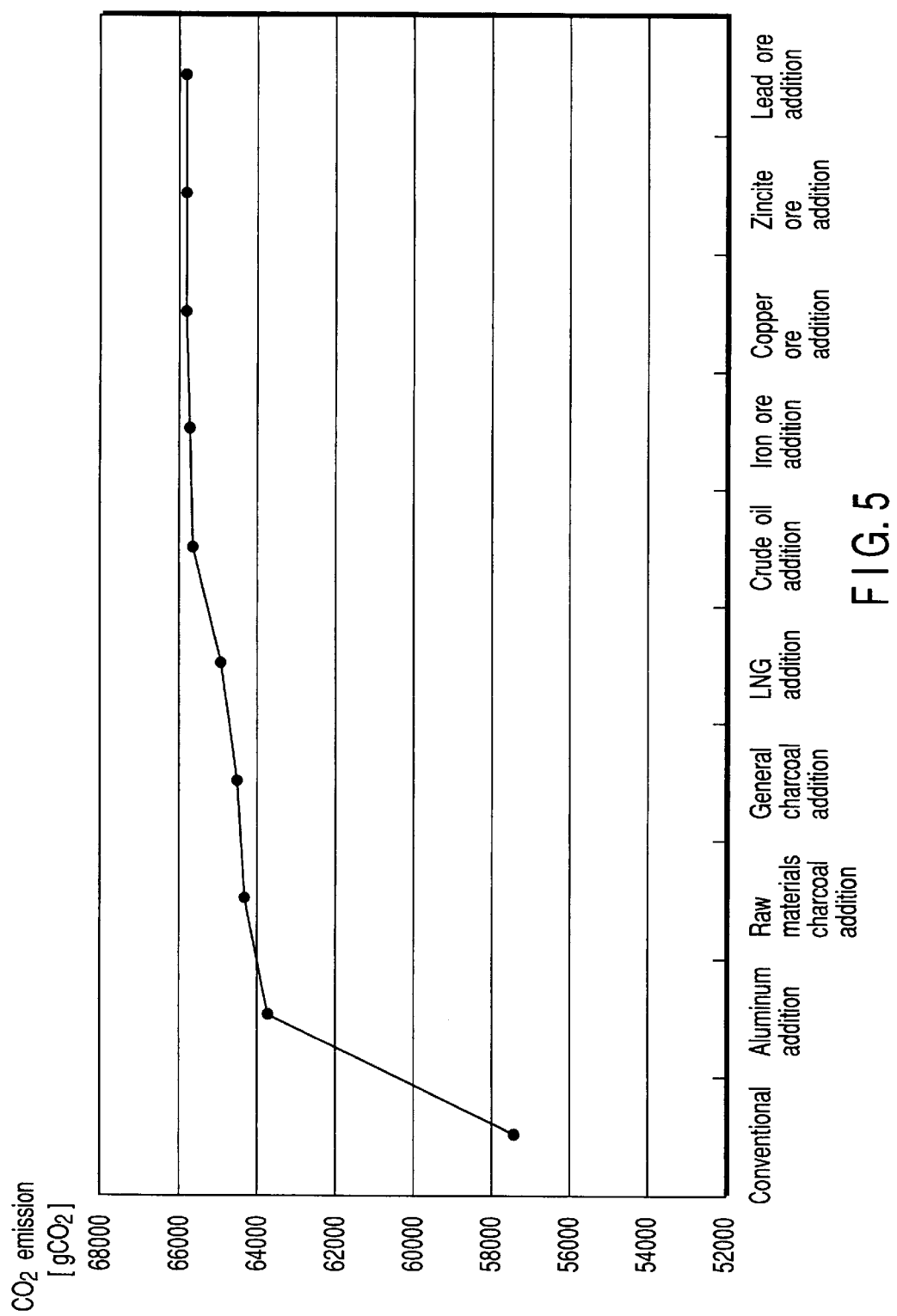
FIG. 5 shows a relation between a selected good and a $CO_2$ emission.

The environmental load emission intensity unit is calculated based on equation 2. The imported goods are increased from one good to nine goods in turn so that effect obtained by considering $CO_2$ emission in overseas about specific imported goods is visible. When the $CO_2$ emission intensity unit obtained by considering only domestic emission as prior art is included, total ten $CO_2$ emission intensity unit are calculated. The $CO_2$ emission computed results of materials supply stage of a washing machine calculated by means of each $CO_2$ emission intensity unit are compared as follows. For example, aluminum ingot, LNG, raw materials charcoal, general charcoal, crude oil, iron ore, a copper ore, lead ore, and zinc ore are added in this order. LCA results using the $CO_2$ emission intensity units, respectively, are shown in FIG. 5. The $CO_2$ emission increases in comparison with a conventional case using the $CO_2$ emission limited to only the country. However, the incrementation rate steps down, in the stage that nine goods were added, elongation of $CO_2$ emission reaches the limit already.

As thus described, after consideration of the materials configuration of a product, even if the imported goods are further increased, it is understood that this increment does not exert a large influence on the $CO_2$ emission calculated as a result.

Setting the basis of selection of the imported goods as above enables effective data gathering. Further, by adopting environmental load in overseas of the imported good selected by the basis of selection when a product and a system is evaluated, it becomes possible to calculate more realistic environmental load, resulting in contributing to development of an environmental harmony type product making environmentally friendly product, reducing the load on the environment.

According to the calculation method of equation 3, the influence of the overseas environmental load of an imported good is easy to grasp. Also, because of an object product of environmental load evaluation, how far the investigation should be performed can be determined in easy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A product environmental load evaluation method comprising:
    computing fuel input coefficients and inverse matrix coefficients (1-Ad) referring to an Input-Output table regarding domestic goods, the inverse matrix coefficients excluding an input coefficient matrix of imported goods regarded as domestically produced;
    generating emission coefficients referring to an existing data stochastic document;
    estimating a direct emission matrix based on the fuel input coefficients and the emission coefficients;
    computing environmental load of the domestic goods based on the inverse matrix coefficients and the direct emission matrix;
    computing an input coefficient matrix of imported goods;
    computing overseas environmental load emission coefficients of the imported goods based on overseas parameters every addition of an imported good,
    computing imported good environmental load based on the input coefficient matrix and the overseas environmental load emission coefficients; and
    computing product environmental load by adding the domestic good environmental load to be provided fixedly and the imported good environmental load updated every addition of an imported good.

2. A product environmental load evaluation method according to claim 1, wherein computing the environmental load emission coefficients includes calculating the environmental load emission coefficients based on input energy in overseas production process, transportation distance to the domestic country, and import ratio to the domestic country.

3. A product environmental load evaluation method according to claim 1, wherein computing overseas environmental load emission coefficient includes calculating overseas environmental load emission coefficients of the imported goods of aluminum ingot, LNG, raw materials charcoal, public charcoal, crude oil, iron ore, copper ore, lead ore, and zinc ore in turn.

4. A product environmental load evaluation method according to claim 1, which includes making database of product environmental load computed by the product environmental load computing.

5. A product environmental load evaluation method according to claim 1, wherein computing imported good environmental load includes calculating the imported good environmental load at least including one of copper ore, lead ore and zinc ore.

6. A product environmental load evaluation method according to claim 1, wherein computing product environmental load includes setting the imported good environmental load in an input-output analysis to add imported goods to domestic goods.

7. A product environmental load evaluation method according to claim 1, wherein computing imported good environmental load includes calculating environmental load of a plurality of imported goods that the environmental load almost shows saturated state.

8. A product environmental load evaluation method according to claim 1, wherein the plural imported goods include six goods of aluminum metal, LNG, raw materials charcoal, general charcoal, crude oil, and iron ore.

9. A product environmental load evaluation program recorded on a computer readable medium, comprising:
    means for instructing a computer to compute fuel input coefficients and inverse matrix coefficients referring to an Input-Output table regarding domestic goods, the inverse matrix coefficients excluding an input coefficient matrix of imported goods regarded as domestically produced;
    means for instructing the computer to generate emission coefficients referring to an existing data stochastic document;
    means for instructing the computer to estimate a direct emission matrix based on fuel input coefficients and emission coefficients;
    means for instructing the computer to compute environmental load of the domestic goods based on the inverse matrix coefficients and direct emission matrix;
    computing an input coefficient matrix of imported goods;
    means for instructing the computer to compute overseas environmental load emission coefficients of the imported goods based on overseas parameters every addition of an imported good;
    means for instructing the computer to compute imported good environmental load based on the input coefficient matrix and the overseas environmental load emission coefficients; and
    means for instructing the computer to compute product environmental load by adding the domestic good environmental load to be provided fixedly and the imported good environmental load updated every addition of an imported good.

10. A program according to claim 9, wherein the means for instructing a computer to compute fuel input coefficients and inverse matrix coefficients includes means for instructing the computer to compute the environmental load emission coefficients based on input energy in overseas production process, transportation distance to the domestic country, and import ratio to the domestic country.

11. A program according to claim 9, wherein the means for instructing the computer to compute overseas environment load emission coefficients includes means for instructing the computer to calculate overseas environmental load emission coefficients of the imported goods of aluminum ingot, LNG, raw materials charcoal, public charcoal, crude oil, iron ore, copper ore, lead ore, and zinc ore in turn.

12. A program according to claim 9, which includes means for instructing the computer to make database of product environmental load computed by the product environmental load computing.

13. A program according to claim 9, wherein the means for instructing the computer to compute imported good environmental load includes means for instructing the computer to calculate the imported good environmental load at least including one of copper ore, lead ore and zinc ore.

14. A program according to claim 9, wherein the means for instructing the computer to compute product environmental load includes means for instructing the computer to set the imported good environmental load in an input-output analysis to add imported goods to domestic goods.

15. A program according to claim 9, wherein the means for instructing the computer to compute imported good environmental load includes means for instructing the computer to calculate environmental load of a plurality of imported goods that the environmental load almost shows saturated state.

16. A program according to claim 15, wherein the plural imported goods include six goods of aluminum metal, LNG, raw materials charcoal, general charcoal, crude oil, and iron ore.

17. A method for evaluating environmental load of products, comprising:

evaluating a product environmental load based on $\epsilon d$ computed by the following equation:

$$\epsilon_d = E \times (1-Ad)^{-1} + \epsilon m \times A''m \times (1-Ad)^{-1} \qquad 2$$

$\epsilon d$ Basic unit consumption matrix of domestic goods;

$\epsilon m$ Discharge unit matrix of environmental load of imported goods in overseas;

E Direct emission coefficient matrix;

Ad Input coefficient matrix of domestic goods;

A"m Input coefficient matrix of selected imported goods.

* * * * *